United States Patent
Harker

(12) 
(10) Patent No.: US 6,424,765 B1
(45) Date of Patent: Jul. 23, 2002

(54) OPTICAL DEVICE AND METHOD OF MAKING THE SAME

(75) Inventor: Andrew Thomas Harker, Ipswich (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 08/656,280

(22) PCT Filed: Dec. 21, 1994

(86) PCT No.: PCT/GB94/02780

§ 371 (c)(1), (2), (4) Date: Sep. 16, 1996

(87) PCT Pub. No.: WO95/18395

PCT Pub. Date: Jul. 6, 1995

(30) Foreign Application Priority Data

Dec. 24, 1993 (GB) .............................................. 9326429

(51) Int. Cl.[7] .................................................. G02B 6/26
(52) U.S. Cl. .............................. 385/31; 385/33; 385/34; 385/43; 385/49
(58) Field of Search .............................. 385/31, 33–35, 385/38, 43, 49–50, 139, 88, 96–99

(56) References Cited

U.S. PATENT DOCUMENTS

| | | | |
|---|---|---|---|
| 4,290,667 A | * | 9/1981 | Chown .......................... 385/96 |
| 4,531,810 A | * | 7/1985 | Carlsen |
| 4,807,954 A | * | 2/1989 | Oyamada et al. .............. 385/38 |
| 4,834,493 A | * | 5/1989 | Cahill et al. ................... 385/77 |
| 4,962,988 A | * | 10/1990 | Swann .......................... 385/34 |
| 5,074,633 A | * | 12/1991 | Cohen et al. .................. 385/43 |
| 5,263,103 A | * | 11/1993 | Kosinski ....................... 385/31 |
| 5,293,438 A | * | 3/1994 | Konno et al. .................. 385/35 |
| 5,384,874 A | * | 1/1995 | Hirai et al. .................... 385/34 |
| 5,619,602 A | * | 4/1997 | Sandstrom et al. ........... 385/31 |

FOREIGN PATENT DOCUMENTS

| | | | |
|---|---|---|---|
| EP | 0 192 164 | * | 8/1986 |
| EP | 0 525 433 | * | 2/1993 |
| GB | 2 175 411 | * | 11/1986 |
| GB | 2 184 289 | * | 6/1987 |

OTHER PUBLICATIONS

AMP, "Designers Guide to Fiber Optics" pp. 24–27, 1982.*

* cited by examiner

Primary Examiner—Hemang Sanghavi

(57) ABSTRACT

An optical device includes an optical waveguide with a block that is fusion spliced to one end. The block has a refractive index approximately equal to the effective refractive index of the waveguide and is of such a length that substantially all the light exiting the waveguide propagates directly to the end of the block remote from the waveguide.

16 Claims, 3 Drawing Sheets

OPTICAL DEVICE AND METHOD OF MAKING THE SAME

FIELD OF THE INVENTION

This invention relates to optical devices and in particular, but not exclusively, to those including a high numerical aperture (NA) optical fibre waveguide.

BACKGROUND OF THE INVENTION

There are many optical devices in which it is necessary to couple the electromagnetic radiation propagated along an optical waveguide to a bulk optic system. This is often achieved by simply end-firing the radiation from the end of the waveguide, for example from the end of a cleaved optical fibre waveguide.

It should be noted that by "optical" is meant that part of the electromagnetic spectrum which is generally known as the visible region together with those parts of the infra-red and ultraviolet regions at each end of the visible region which are capable of being transmitted by dielectric optical waveguides such as optical fibres.

The present invention will be discussed in the context of optical fibre waveguides but, as will be clear, the present invention is applicable to other types of waveguide in which there is a waveguiding core surrounded by a cladding-type region, for example buried doped-silica in silica waveguides.

It is often desirable to reduce the reflectivity of the waveguide end to radiation impinging on it via the waveguide. Three currently known ways to do so are to apply an anti-reflection coating to the cleaved surface, to angle the end of the fibre so the end face is not normal to the waveguide, and to use an index-matching compound to fill the gap between the end of the optical fibre and the next optical component.

One application where a low reflectivity transition between guided and bulk optics is required is in coupling the output of an optical fibre amplifier to an optical receiver assembly of which the nearest component to the optical fibre is, perhaps, a radiation gathering lens. The gain provided by such amplifiers can be limited by the reflectivity of the end face. The amplifier will lase if the round trip gain of the amplifier, of which one component is residual facet reflectivity, is greater than the losses.

Index matching compounds are only useful if the next component abuts the optical waveguide, such as a GRIN (Graded Index) lens or plano-lens. Also, there are concerns over the use of such organic materials in the optical path because of their degradation in time by radiation, moisture and other environmental influences.

Multi-layer dielectric anti-reflection coatings are used but it is difficult to reduce the residual reflectivity of the fibre end below 0.1% (30 dB) using such anti-reflection coatings and the lower the reflectance the narrower the wavelength range within which the reflectance is suitably low.

Angling the end of the fibre is useful for low NA fibres (NA~0.12) where an angle of 12° between the cleave and the waveguide axis reduces the reflectance to 40 dB and where the polarisation sensitivity introduced by the angled interface, 0.02 dB for a 12° angle, can be accepted. However, for high NA fibres (NA~0.4), of which optical fibre amplifiers are an example, a 12° cleave angle provides an improvement to 20 dB, only a small improvement on 14 dB for a 0° facet, while in instrumentation applications a variation in transmitted power with polarisation state of 0.02 dB, or even 0.008 dB for an 8° angle, is not acceptable.

SUMMARY OF THE INVENTION

According to a first aspect of the present invention there is provided an optical device having an optical radiation output, the optical device comprising an optical waveguide having an end through which the optical radiation output of the device may pass, and a block fusion spliced to the end of the optical waveguide to reduce reflections of the optical radiation output from the said end, wherein the block has a refractive index approximately equal to the effective refractive index of the waveguide, a length such that substantially all the radiation exiting the waveguide propagates directly to, and subsequently through, the free end of the block remote from the waveguide, and the free end of the block is substantially planar.

The present invention provides an optical device in which the waveguide termination can readily have a reflectance of less than 30 dB.

The block is preferably a cylinder of material of dimension and form that can be fusion spliced to the waveguide with a standard fusion splicer. Although the diameter of such a block may be less than the diameter of the waveguide it is preferable that it is of a greater diameter when the waveguide is an optical fibre so that a longer length of block may be used which gives a greater improvement in reflectance.

The end of the block remote from the optical waveguide is preferably provided with an anti-reflection coating. As will be explained in more detail below, a relatively inefficient coating of 0.3%, but one which is broadband and readily applied, can reduce the reflectance from 44 dB to 55 dB which is entirely satisfactory for use in fibre amplifier applications.

Some of the radiation reflected from the internal surface of the end of the block remote from the waveguide can be internally reflected from the sides of the block to re-enter the waveguide so increasing the effective reflectance of the fibre termination. This can be reduced, in a preferred embodiment, by providing the surfaces of the block other than the end face with a coating of a higher refractive index than the block to suppress the above-described internal reflections.

The block should not be too long as this will produce some internal reflections of the radiation as it propagates to the distant end of the block (or is absorbed by the higher refractive coating on the lateral surfaces of the block if provided) and cause a reduction in the radiation that can be output to the external components. If the block is too short the reflectance is higher than the best achievable as will be explained in more detail below. Although such reduced performance may be acceptable, and will fall within the scope of the present invention in its broadest aspects, it is preferable that the core radiation end-firing from the waveguide reaches the distant end face of the block with the base of the cone just within the circumference of that end face so that all, not just substantially all, the radiation propagates directly to the end of the block.

More particularly, if the block is a cylinder of refractive index n, of circular cross-section of radius r and has a length l, and it is substantially coaxial with a waveguide of numerical aperture denoted NA, then the half angle θ of the cone of end-fired radiation equals $\sin^{-1}(NA/n)$ which is preferably equal to or less than $\tan^{-1}(r/l)$.

Although applicable to optical fibre waveguides generally, the present invention finds particular application with optical fibre waveguides of high NA, i.e. >0.15, for example in the region of NA=0.4. An erbium fibre optical amplifier is an example of such a high NA fibre for which the present invention is particularly useful.

In the case of a silica-based, optical fibre waveguide, such as an erbium fibre amplifier, the block is conveniently a coreless silica fibre.

A convenient method of forming an optical device, and which constitutes a second aspect of the present invention, is one in which a block is fusion spliced to the end of the fibre waveguide after which the block is cleaved to provide a block of predetermined length.

The differential diameters of the block and the waveguide is limited by the fusion splicing process. If a longer block is required this limitation can be overcome by forming a stepped block by splicing two sub-blocks of increasing diameter together, the lesser diameter sub-block diameter being spliced to the optical waveguide.

One method of forming such an optical device is one in which two sub-blocks are first fusion spliced together. The one of lesser diameter is then cleaved to provide a first sub-block of predetermined length. This cleaved end is then fusion spliced to the waveguide and the sub-block of greater diameter subsequently cleaved to provide a second sub-block of predetermined length.

Devices with blocks having more than two sub-blocks similarly fusion-spliced to form a single block could also be used with the present invention.

An alternative method of providing a block having a larger diameter remote from the waveguide is to use a block in the form of a tapered rod, for example, of frustroconical shape. The angle of divergence of the sides of the block should be selected to avoid unwanted reflections back in the waveguide.

In some cases, if the cladding of the waveguide is sufficiently wide, one could use a block which falls within the perimeter of the waveguide.

BRIEF DESCRIPTION OF THE DRAWINGS

Embodiments of the present invention, and methods of making the same, will now be described, by way of example only, with reference to the accompanying drawings, of which.

DETAILED DESCRIPTION OF THE PREFERRED EMBODIMENTS

Figure 1:
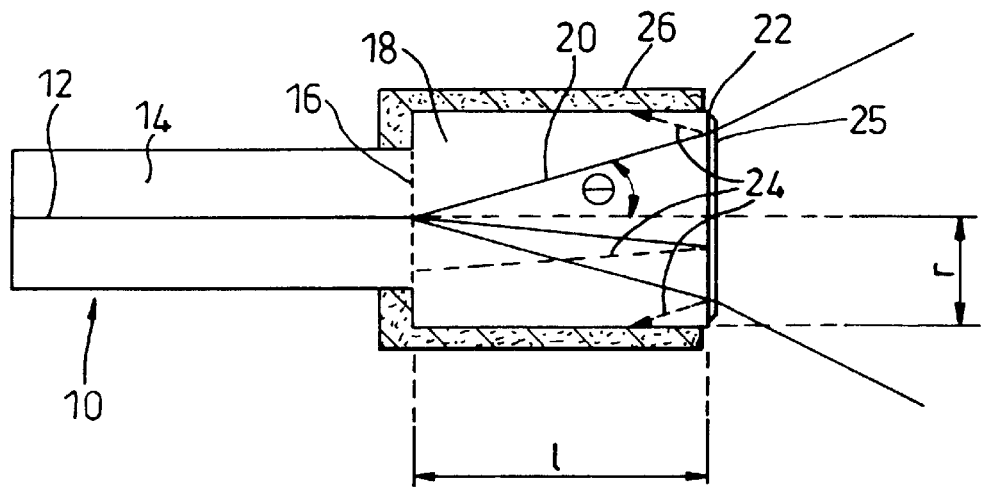
FIG. 1 is a cross-sectional view of a first embodiment of the present invention.
Figure 2:
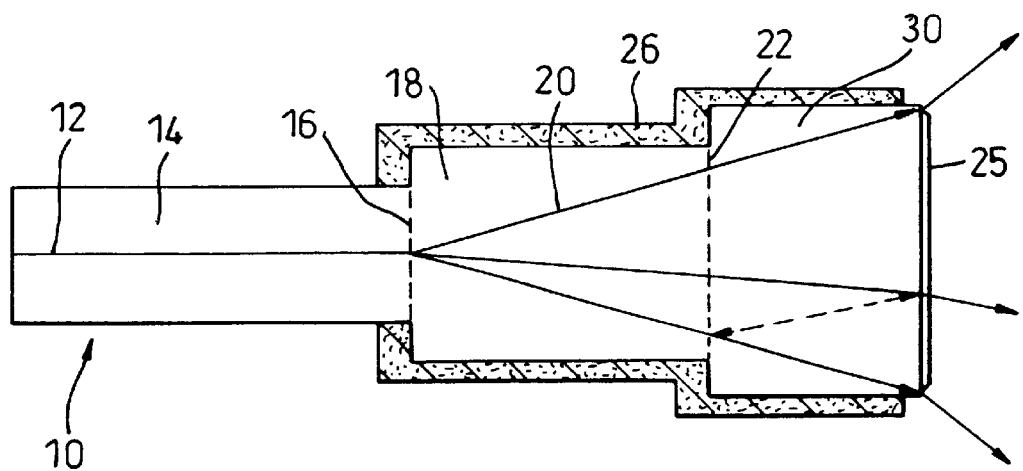
FIG. 2 is a cross-sectional view of a second embodiment of the present invention.

Referring to FIGS. 1 and 2, a conventional and well known erbium ion doped optical fibre 10 useful as an optical amplifier has an erbium ion doped core region 12 surrounded by a cladding region 14 having an end 16 from which it is desired to end-fire amplified optical radiation at approximate 1.55 $\mu$m. The fibre 10 in this case has a high numerical aperture equal to approximately 0.4.

Fusion spliced to the fibre 10, by conventional fusion splicing apparatus, is a block 18 in the form of a portion of coreless, all-silica optical fibre of radius r, length l and refractive index n. The fibre 10 and block 18 are largely homogeneous over the splice which is indicated schematically by the dotted line at their original interface at end 16.

Optical radiation end-firing from the waveguide 12 at end 16 exits as a ray cone 20 of radiation and propagates towards the end 22 of the block 18 remote from the fibre 10 with a half angle equal to $\tan^{-1}(NA/n)$.

The end 22 of the block 18 has a conventional anti-reflection coating 25 to reduce the reflectivity from this facet to about 0.3%.

Some of the optical radiation striking the end 22 of the block 18 will be reflected back towards the waveguide as indicated, generally, by rays 24.

Those rays striking the waveguide core region 12 at the end 16 of the fibre 10 within the ray cone 20 will be coupled into the waveguide and determine the net reflectance of the optical device of FIG. 1. The amount of radiation so reflected back to waveguide core region 12 is reduced by providing the exposed surfaces of the block 18 other than the end 22 with a coating 26 of a higher refractive index than the block 18.

The length l of the block 18 is preferably such that the perimeter of the base of the cone 20 is coincident with the perimeter of the end face 22 of the block 18 but is shown shorter than optimum to better illustrate the reflection of the rays at the surface of the cone 20 to the sides of the block 18.

The reflectance of the optical device of the present invention can be estimated as follows.

Consider two coaxially aligned like fibres a distance z apart one end-firing radiation of wavelength $\lambda$ towards the other. It is known that for z much greater than the diameter of the core regions of the fibres the loss of radiation that exits one core to strike the core region of the other fibre is given by $$\text{loss}=-10\log(1/Z.Z) \text{ dB}$$

where $$Z=z.\lambda/(2.\pi.n'.w^2)$$

and where n' is the refractive index of the medium between the two fibres and w is the mode field radius in the fibres.

If the intervening medium is considered to be a very wide block of material of a refractive index close to the effective refractive index of the optical fibre then there will be negligible reflection losses at the fibre-block interfaces and the above-expression represents the coupling loss between the two fibres. This is the same as the coupling loss from a fibre to itself from a block of FIG. 1 of length z/2 with a perfectly reflective end 22. If, as in the embodiment of FIG. 1, the end 22 of the block 18 is not perfectly reflecting the reflected power will be attenuated accordingly from the figure calculated above.

If one considers the embodiment of FIG. 1, the effective refractive index, $n_{eff}$, presented to optical radiation guided by the core region 12 of the fibre 10 is intermediate the refractive index of the core region 12, $n_{core}$, and the refractive index of the surrounding cladding region 14, $n_{cl}$. For typical fibres the designed normalised frequency of the fibre, V, is about 2.2 which in the fibre 10 of FIG. 1 provides an effective refractive index $$n_{eff}=n_{cl}+0.45(n_{core}-n_{cl})$$

Figure 3:
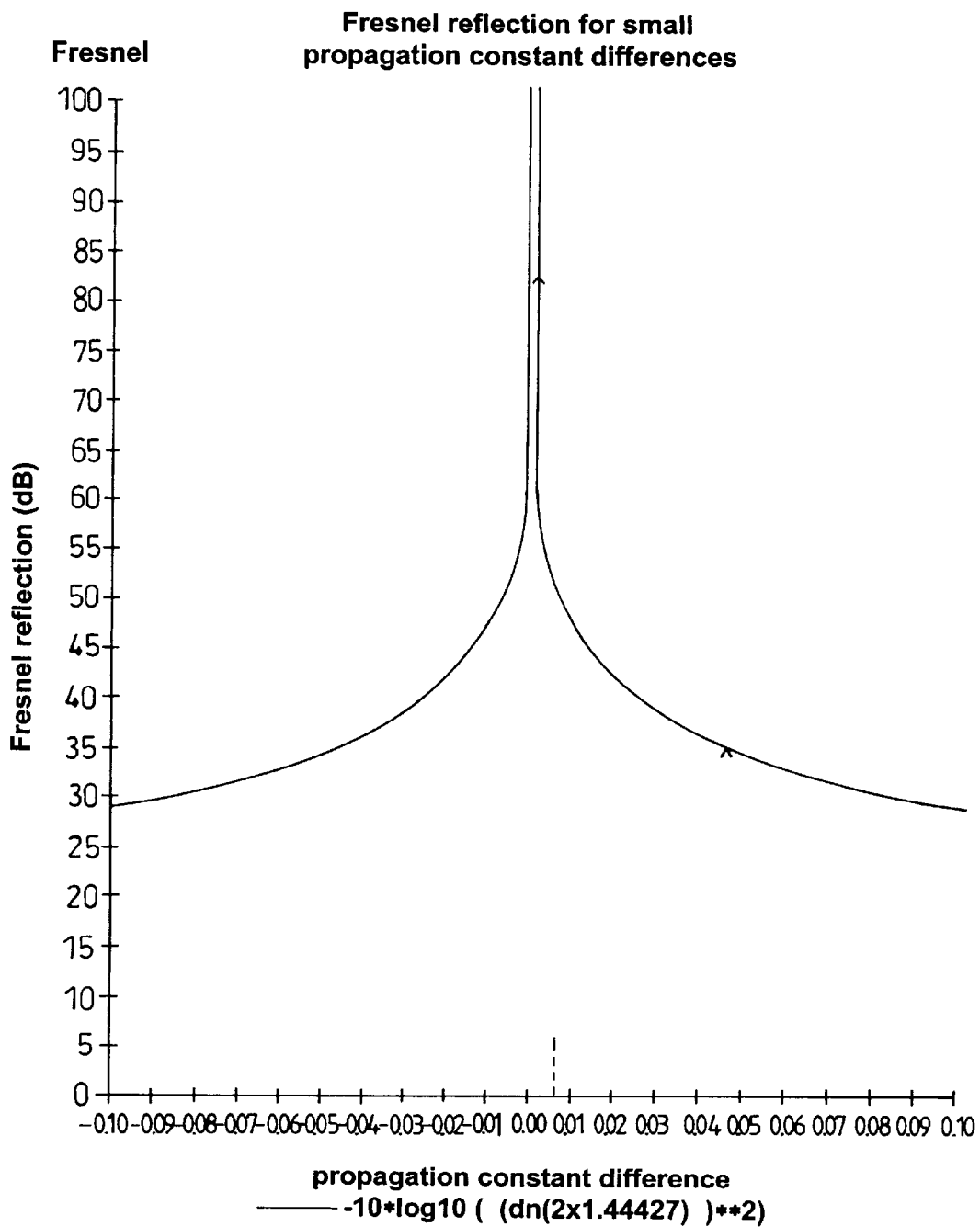
FIG. 3 is a graph of the Fresnel reflection at the interface of two fusion splice fibres as a function of propagation constant difference in the fibres.

The Fresnel reflectance at the fusion spliced join of the optical fibre 10 and the silica block 18 is shown at FIG. 3 where the reflectance in dB is plotted as a function of the propagation constant difference between media.

In the present embodiment $$n_{cl} = n = 1.444$$

$$n_{core} = 1.458$$

which provides a propagation constant difference of $6.3 \times 10^{-3}$ which leads to a Fresnel reflectivity of −53 dB. This, for the parameters given, is the theoretical limit to the performance of this invention. The propagation constant difference is preferably less than 7% and most preferably less than 1%.

For a 0.4 NA, silica based erbium fibre doped fibre the optimum length of the silica block 18 having a diameter of 200 μm is about 180 μm. The reflectance to the waveguide 10 from a cleaved, uncoated, end 22 is 44 dB assuming a reflectance at the surface 22 of about 4%. In the present embodiment, the 0.3% anti-reflection coating 25 reduces the reflectance presented to the waveguide 10 from 44 dB to 55 dB.

The core-less fibre is convenient to use with this embodiment as it is readily obtainable as "plastic clad silica" fibre with the cladding removed and with diameters creasing in steps of 100 μm from 100 μm. A block of chemically pure silica would also have a refractive index suitable for use with the silica-based optical waveguides such as the erbium-doped fibre amplifiers.

To prevent some reflections of rays 24 back to the core region 12 of the fibre 10, the surfaces of the block 18 other than the end face 22 are provided with a coat 26 of a material of higher refractive index than the block 18 to couple these rays 24 out of the block 18.

The diameter of the block 18 of FIG. 1 is limited by the diameter of the optical fibre 10 and the particular fusion splicing technique employed. The optical device of FIG. 2 illustrates how a wider ended diameter block can be constructed from spliced fibres.

Referring to FIG. 2, the optical fibre amplifier 10 and the block 18 are as illustrated in FIG. 1 with the same parts indicated by the same reference numerals. In this case a further silica block 30 is fusion spliced coaxially to the end 22 of block 18. The blocks 18 and 30 can be conveniently referred to as sub-blocks. The difference in diameter of these sub-blocks 18 and 30 is such as to allow fusion splicing. The higher refractive coat 26 extends over the lateral surfaces of both sub-blocks 18 and 30.

A convenient method of manufacturing the optical device of FIG. 1 is to fusion splice a length of silica fibre to the optical fibre 10 which is greater than 1 (the final desired length of the whole block 18 plus 30) and so more readily manipulated. The silica fibre 18 is then cleaved to reduce its length as desired followed by coating the end 22 with the anti-reflective coating 25 and the other surfaces with a higher index material 26 in known ways.

The optical device of FIG. 2 may be manufactured by first fusion splicing two lengths of silica fibre 18 and 30 together, again each longer than needed in the device. The smaller diameter fibre 15 is then cleaved to the required length and fusion spliced to the optical fibre 10. The larger diameter fibre 30 is then cleaved to size and the anti-reflection coating 25 and high refractive index coating 26 applied as before. Alternatively, the optical device of FIG. 2 could be manufactured by taking a device as shown in FIG. 1, fusion splicing a length of silica fibre to the block 18, which is of greater diameter than the block 18, and cleaving this length to the desired length to form the block 30. The coatings 25 and 26 can then be applied as before.

The principle of the stepped block as shown in FIG. 2 can be readily extended, it will be appreciated, to blocks made up from more than two sub-blocks, if desired.

Where a small variation in transmitted power with polarisation state can be tolerated, the end surface of the block may be angled so it is non-normal to the optical fibre 10 to reduce the reflectance back to the core 12 of the fibre 10 further, or as an alternative to the use of an anti-reflection coating.

It should be noted that the additional anti-reflection measures described above, for example the higher refraction index coating 26 and anti-reflection measures applied to the end face of the block 18 or 30, are optional and need not be present in an optical device according to the present invention.

Figure 4:
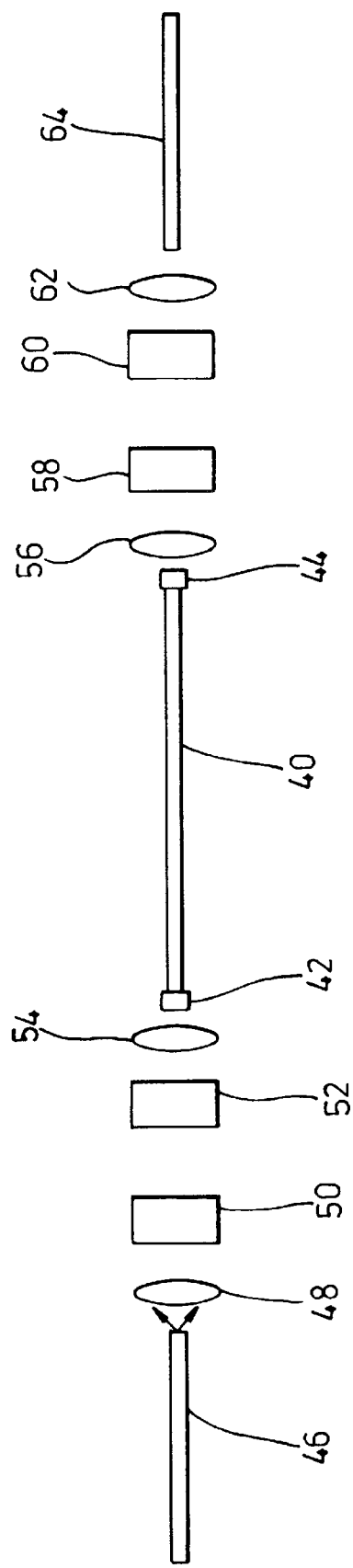
FIG. 4 is a schematic diagram of an optical system including optical devices as shown in FIG. 1.

Referring now to FIG. 4, an optical system illustrates the application of the present invention to reduce the reflectance at the end facets of an erbium fibre amplifier 40 by providing each end with a respective optical device 42, 44 of the type illustrated in FIG. 1. Light end-fired from an input fibre 46 is collimated by a lens 48 and passed through optical components generally indicated by boxes 50 and 52 which may be optical isolators or wavelength division multiplexers, for example.

A second lens 54 couples the light exiting the optical component 52 into the erbium doped fibre 40 through the optical device 42 of the present invention. Light exits the fibre 40 through the optical device 44 to be collimated by a lens whereupon it passes through optical components 58 and 60, again illustrated generally by boxes. These optical components may again be optical isolators or wavelength division multiplexers, for example. The light from optical component 60 is then coupled by a further lens 62 into an output optical fibre 64.

Figure 5:
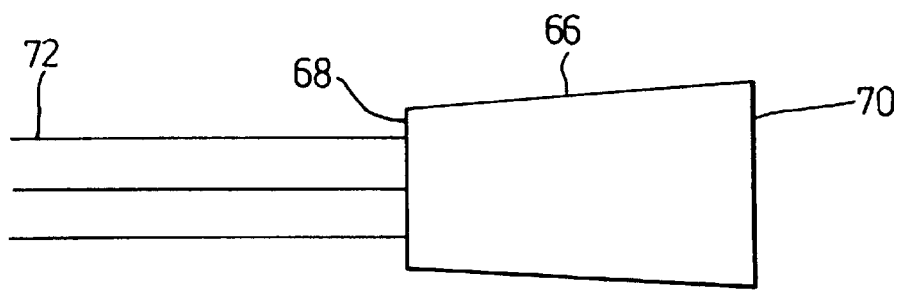
FIG. 5 is a schematic diagram of a third embodiment of the present invention.

Referring now to FIG. 5, a further embodiment of the present invention has a block in the form of a frustoconical portion 66 of a tapered rod (not shown) having smaller end 68 and larger end 70. The end 68 is fusion spliced to an optical fibre 72.

What is claimed is:

1. An optical device for transmitting input optical energy to an optical radiation output, the optical device comprising an optical fibre having an output end for passage of optical radiation and a block fusion spliced to the output end of the optical fibre to reduce reflections of the optical radiation output from said output end, said block having a free end that is remote from said output end, is substantially planar and exhibits a common refractive index throughout its bulk that is approximately equal to the effective refractive index of the optical fibre and, where fusion spliced to the optical fibre, having a diameter greater than the optical fibre, said block further having a length such that substantially all the radiation exiting the optical fibre output propagates directly to, and subsequently through said free end which thereby serves as said optical radiation output.

2. An optical device as claimed in claim 1, in which the optical fibre has a numerical aperture greater than 0.15.

3. An optical device as claimed in claim 1, in which the block is formed from coreless optical fibre.

4. An optical device as claimed in claim 1, in which the optical fibre is an optical fibre amplifier.

5. An optical device as claimed in claim 4, in which the optical fibre amplifier is an erbium fibre amplifier.

6. An optical device as claimed in claim 1, in which the surfaces of the block other than the end remote from the optical fibre have a coating of a material of higher refractive index than the block.

7. An optical device as claimed in claim 1, in which the end of block remote from the optical fibre has an anti-reflective coating.

8. An optical device as claimed in claim 3, in which the block is a unitary block, the end of the block that is spliced to the optical fibre having a smaller diameter than the end of the block remote from the optical fibre.

9. An optical device as claimed in claim 8, in which the refractive index of the block and the effective refractive index of the optical fibre are such that the propagation constant difference of the block and the optical fibre is less than 3%.

10. An optical device as claimed in claim 8, in which the block is a tapered rod.

11. An optical device as claimed in claim 8, in which the block is generally frusto-conical.

12. An optical device as claimed in claim 7 in which the block is a tapered rod.

13. An optical device as claimed in claim 1, in which the block comprises a series of two or more sub-blocks of successively greater diameter fusion spliced to each other.

14. An optical device as claimed in claim 1, in which the refractive index of the block and the effective refractive index of the optical fibre is such that the propagation constant difference of the block and the optical fibre is less than 7%.

15. An optical device as claimed in claim 1, in which the refractive index of the block and the effective refractive index of the optical fibre are such that the propagation constant difference of the block and the optical fibre is less than 3%.

16. An optical device for transmitting input optical energy to an optical radiation output, the optical device comprising an optical fiber having an output end for passage of optical radiation and a block fusion spliced to the output end of the optical fiber to reduce reflections of the optical radiation output from said output end, said block having a free end that is remote from said output end, is substantially planar and exhibits a common refract index n throughout its bulk that is approximately equal to the effective refractive index of the optical fiber and, where fusion spliced to the optical fiber, having a diameter greater than the optical fiber, said block further having a length l and a circular cross section of radius r such that substantially all the radiation exiting the optical fiber output propagates directly to, and subsequently through, said free end which thereby serves as said optical radiation output, wherein the numerical aperture of the optical fiber is NA, and in which $$\sin^{-1}(NA/n) \leq \tan^{-1}(r/l).$$

* * * * *